April 28, 1931.  A. WALTNER  1,802,363
ANIMAL TRAP
Filed Feb. 19, 1929  2 Sheets-Sheet 1
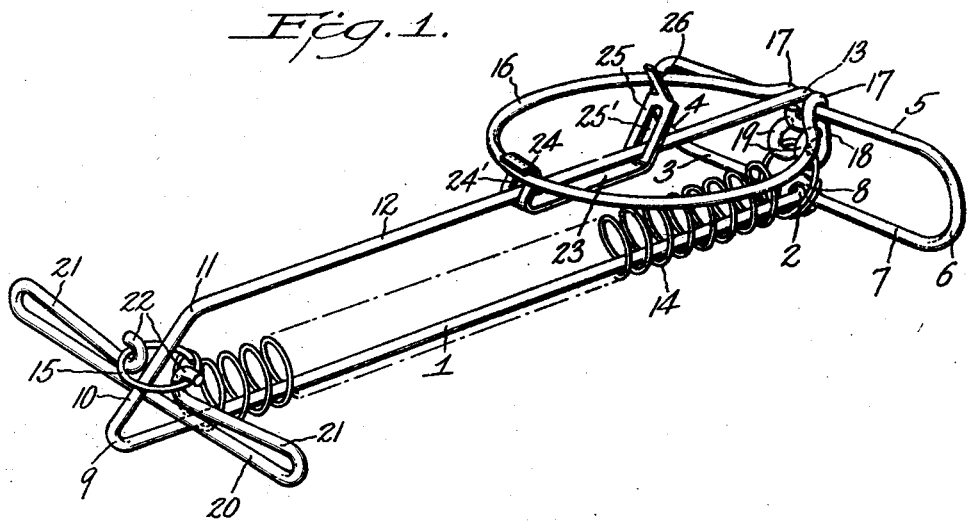
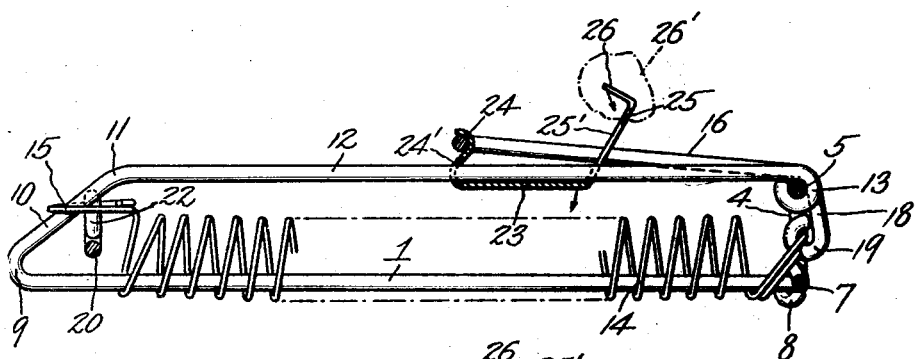
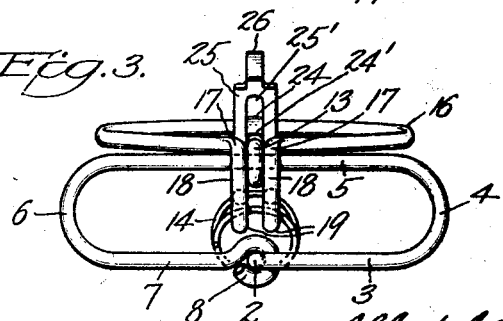
Inventor
Albert Waltner
By his Attorney
Frederick W. Barker April 28, 1931.  A. WALTNER  1,802,363
ANIMAL TRAP
Filed Feb. 19, 1929  2 Sheets-Sheet 2
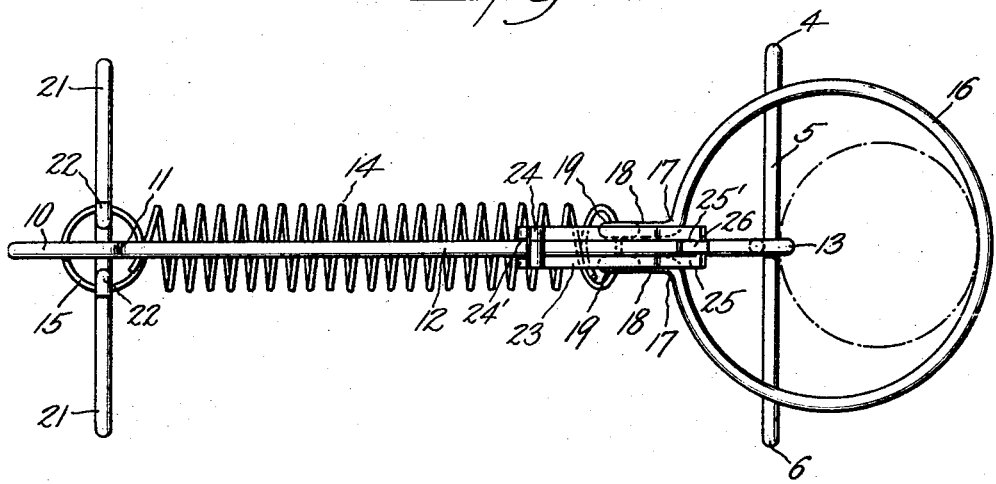
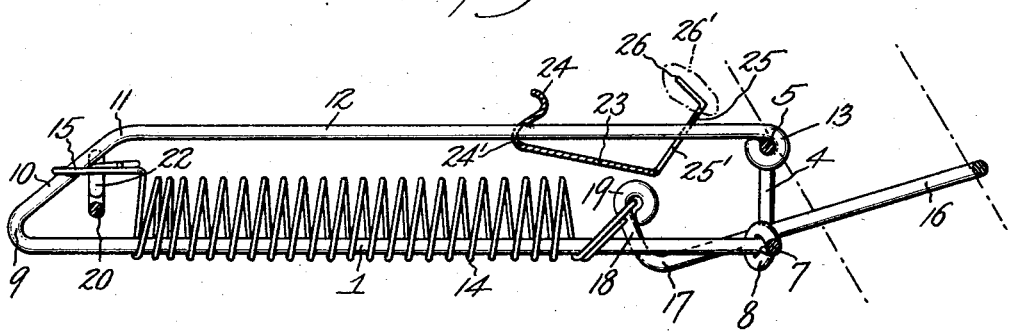
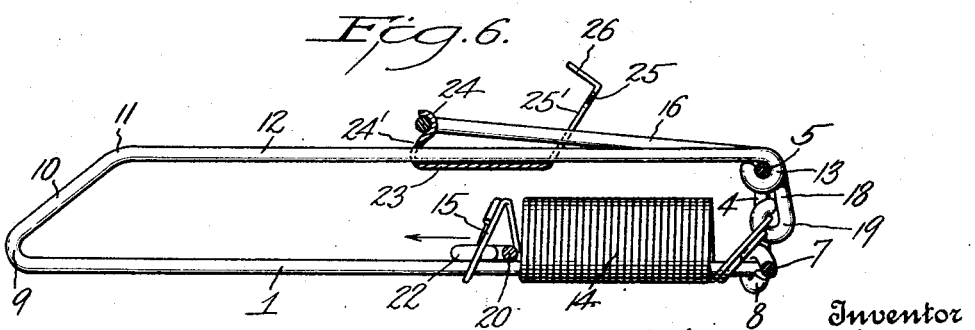
Inventor
Albert Waltner
By his Attorney
Frederick W. Barker Patented Apr. 28, 1931

1,802,363

UNITED STATES PATENT OFFICE

ALBERT WALTNER, OF NEW HYDE PARK, NEW YORK

ANIMAL TRAP

Application filed February 19, 1929. Serial No. 341,218.

This invention relates to improvements in traps for the humane catching and instant killing of fur bearing animals, thereby avoiding the torture that results from merely maiming, as well as preventing injury to the fur.

Therefore my invention consists in the novel construction of a trap having a stiff loop or ring adapted, as an animal attacks the bait, to be thrown by spring action over the animal's head, striking the back of its neck with a powerful impact; said ring or loop also, in the same spring action, being drawn across a guide bar, that opposes the animal's throat, to tensionally grip the neck between the forward portion of said ring or loop and said guide bar.

Also the invention includes novel means whereby the trap can be set with the spring extended, and with bait holding means for releasably engaging the loop or ring in such manner that an attack on the bait will cause the trap to be sprung.

Other features and advantages of my invention will hereinafter appear.

In the drawings:—

Figure 1 is a perspective elevation of my improved animal trap, as set.

Fig. 2 is a side sectional elevation thereof.

Fig. 3 is an end view of Fig. 2

Fig. 4 is a top plan view, showing the trap sprung and engaging an animal's neck, which is indicated by the dot and dash circle.

Fig. 5 is a side sectional elevation of Fig. 4, the animal's neck here being represented by the dot and dash lines, and Fig. 6 is a side sectional elevation of the trap with the spring released.

The frame of my improved trap is here shown as composed of stout wire or rod, which may have continuous extent, suitably bent or shaped to comprise the different frame members. Thus, there is the member 1, having the bend 2 at one end to produce a loop composed of bar 3, bend 4, bar 5 that is in spaced parallelism with bar 3, bend 6, and bar 7 that lies axially opposed to bar 3, the end of bar 7 being formed into an eye 8 that engages the bend 2.

The opposite end of member 1 is provided with a bend 9 from which there continues a return angled portion 10 that connects by bend 11 with a member 12 which extends co-extensively with member 1, in spaced parallelism therewith, to bar 5, the end of member 12 being formed into an eye 13 that engages bar 5, centrally thereof.

A strong helical spring 14 is placed loosely over the member 1, said spring being connected to an angled extension of a ring that, in the unsprung condition of the trap, lies over the bar 5 and above member 1, although said ring is adapted, in the operation of the trap, to be drawn around said bar 5 and through the loop of which said bar forms a part.

The ring herein illustrated is a split ring, it being composed of a single length of stout wire 16, shaped into an incomplete circle and having its end portions provided with the bends 17, 17, from which there continue the angled members 18, 18, respectively having the terminal eyes 19, 19, which are connected with one end of spring 14.

A cross-piece, connected with the other end of spring 14, serves as a handle for extending the spring to set the trap. As here shown said cross-piece is formed of a piece of stout wire 20 inserted between the end coils of the spring, and having turned back portions 21, 21, whose ends are formed into opposed hooks 22, 22 which respectively engage the end coil 15 of the spring at opposite sides of said coil. Due to the bulk provided by wire 20 and the turned back portions 21, 21, interposed between end coil 15 and the next adjacent coil of spring 14, thereby said end coil 15 is spread apart and held in spaced relation from said next adjacent coil. Therefore a clearance is provided which enables said end coil 15, when the spring is extended, to be slipped over the bend 9 and lodged upon the portion 10.

Placed upon the member 12 is a bait carrying member which consists of a flat strip 23 having the upturned ends 24, 25 which are respectively provided with the slots 24', 25' that engage the member 12.

The end 25 has bait holding means, indicated at 26, and end 24 is shaped as a hook adapted to releasably engage the forward portion of ring 16.

In Fig. 6 the spring appears inert, with the hook end 24 engaged with ring 16, bait 26' (see Fig. 2) being affixed to the other end of strip 23.

In order to extend the spring 14 and set the trap the device is placed on end with the loop composed of members 5, 3, 7 resting upon the ground, whereupon the oppositely extending portions of said loop can be held fixedly by the user placing his feet thereon. Then the user, grasping with his hands the handle composed of members 20, 21, 21 pulls said handle upwardly until the end coil 15 of the spring slips over the bend 9 and becomes lodged upon portion 10.

The reason for providing the device with the described means for its setting is because thereby the powerful spring which it is desirable to employ can conveniently be extended.

When the trap is thus set and laid upon the surface, as shown, the bait holding member by its hooked end 24 so sensitively holds the tensioned ring 16 that a slight touch upon end 26, as by an animal nosing or attacking the bait, will release the ring. Then the spring being freed, will contract in the direction of the handle, taking the ring with it. At the moment of nosing the bait the animal's head is projected above the area encircled by ring 16, and its throat located over bar 5. In the spring retraction the ring 16, which is fulcrumed by bar 5 is thrown upwardly and rearwardly until its forward portion strikes the back of the animal's neck, said ring then being drawn under the loop bar 5 to a position such as that shown in Figs. 4 and 5, in which the animal's neck is gripped between the ring and bar 5.

With the spring 14 of sufficient power the impact of the ring against the back of the neck serves either to kill the animal, or at least to stun it, and the immediately succeeding drawing of the ring toward bar 5, over the interposed neck, assures quick and painless death.

Variations within the spirit and scope of my invention are equally comprehended by the foregoing disclosure.

I claim:—

1. The combination in an animal trap having a frame of a bait holding member, fixed means on said frame opposed to the throat of an animal attacking the bait, a ring adapted to be fulcrumed upon said fixed means, a spring to tension said ring, means upon said frame to hold said spring extended, with the ring held over said fixed means, and means upon said bait holding member to releasably engage said ring, whereby upon release said ring is first thrown back and then drawn under said fixed means.

2. An animal trap composed of upper and lower longitudinal members in spaced relation, a transversely disposed looped member connecting said longitudinal members at one end thereof, an angled connecting portion at their other end, a helical spring loose upon said lower longitudinal member, a ring having an angled extension that connects with said spring at one end thereof, said ring lying normally over said upper longitudinal member, bait carrying means mounted on said upper longitudinal member and adapted to releasably engage said ring, means connected to the opposite end of said spring, for extending it, and means upon said spring as extended to engage the angled connecting portion of said longitudinal members.

3. The combination in an animal trap of a frame composed of stout wire bent to form upper and lower longitudinal members in spaced parallelism, one of said members being extended in the form of a transverse end loops, with upper and lower members opposed respectively to said upper and lower longitudinal members, the other ends of said longitudinal members being connected by an angled portion, a helical spring loose upon said lower longitudinal member, a split ring that lies normally over said upper longitudinal member, said ring having angled ends that engage one end of said spring, a double cross-piece of stout wire disposed at the opposite end of said spring, said cross-piece lying between the end coil and next adjacent coil of the spring to space them apart and having end hooked portions to engage said end coil, said cross-piece forming a handle whereby the spring may be extended and the end coil of the spring caught over the angled portion of the longitudinal members, and a bait carrying member loosely mounted on said upper longitudinal member and provided with means for releasably engaging said ring, said ring adapted upon its release to be thrown backwardly by the spring and then drawn forwardly to co-act with the upper member of the transverse loop.

Executed this 16 day of February, 1929.

ALBERT WALTNER.